United States Patent
Banappagol et al.

(10) Patent No.: US 12,074,518 B2
(45) Date of Patent: Aug. 27, 2024

(54) MULTI-PHASE SWITCHING CONVERTER UNDER A PHASE-ADDED OPERATION AND CONTROL METHOD THEREOF

(71) Applicant: Monolithic Power Systems, Inc., Kirkland, WA (US)

(72) Inventors: Mallikarjun Banappagol, Cambridge (GB); Thomas J. O'Brien, Powell, OH (US)

(73) Assignee: Monolithic Power Systems, Inc., Kirkland, WA (US)

( * ) Notice: Subject to any disclaimer, the term of this patent is extended or adjusted under 35 U.S.C. 154(b) by 195 days.

(21) Appl. No.: 17/884,897

(22) Filed: Aug. 10, 2022

(65) Prior Publication Data
US 2024/0055986 A1  Feb. 15, 2024

(51) Int. Cl.
  *H02M 3/156* (2006.01)
  *H02M 3/07* (2006.01)
  *H02M 3/157* (2006.01)

(52) U.S. Cl.
  CPC ............. *H02M 3/157* (2013.01); *H02M 3/07* (2013.01)

(58) Field of Classification Search
  CPC ...... H02M 3/155; H02M 3/156; H02M 3/157; H02M 3/07; H02M 3/02
  See application file for complete search history.

(56) References Cited

U.S. PATENT DOCUMENTS

| | | | | |
|---|---|---|---|---|
| 9,606,559 | B2* | 3/2017 | Ozawa | H02M 3/1584 |
| 9,837,906 | B1* | 12/2017 | Childs | H02M 3/1584 |
| 10,063,078 | B2 | 8/2018 | Xu et al. | |
| 10,116,155 | B2 | 10/2018 | Xu et al. | |
| 10,673,268 | B2 | 6/2020 | Xu | |
| 11,329,556 | B1* | 5/2022 | Yang | H02M 3/1584 |
| 11,342,848 | B2* | 5/2022 | Luo | H02M 1/0003 |
| 11,356,023 | B2* | 6/2022 | Jiang | H02M 3/1584 |
| 11,545,902 | B2* | 1/2023 | Luo | H02M 3/1584 |
| 2017/0060154 | A1* | 3/2017 | Ozawa | H02M 3/1584 |
| 2023/0336082 | A1* | 10/2023 | Dai | H02M 3/1586 |

\* cited by examiner

*Primary Examiner* — Adolf D Berhane
(74) *Attorney, Agent, or Firm* — Perkins Coie LLP

(57) ABSTRACT

This disclosure provides a control method for multi-phase switching converter having a master phase and at least one slave phase. The control method comprises: providing a pulse signal with 0.5 duty cycle by frequency-dividing a master control signal supplied to the master phase; and for each slave phase to be enabled, setting a ratio of a charge current and a discharge current based on a slave phase number under a phase-added operation, charging a first capacitor with the charge current and discharging a second capacitor with the discharge current in high logic of the pulse signal, discharging the first capacitor with the discharge current and charging the second capacitor with the charge current in logic low of the pulse signal, and generating a respective enable signal for controlling a switch in a corresponding slave phase by comparing a first capacitor voltage with a second capacitor voltage.

20 Claims, 8 Drawing Sheets

MULTI-PHASE SWITCHING CONVERTER UNDER A PHASE-ADDED OPERATION AND CONTROL METHOD THEREOF

TECHNICAL FIELD

The present invention generally relates to electronic circuits, and more particularly but not exclusively, to multi-phase switching converter and control circuit and control method thereof.

BACKGROUND

In a multi-phase switching converter, such as a multi-phase buck converter, sets of switches and corresponding inductors are coupled in parallel to one another, and the set of switches are operated in alternating phases. The multiple phase outputs are combined to provide an overall output current. There can be one, two, three or more phases based on power demand of the electronic device application. Power demand can vary widely during use, and to meet these swings in power requirements, the phases of the multi-phase converter may be added and shed to regulate an amount of current that is being provided. When the load current is small, only a single phase in the multi-phase converter work and transfer energy to the load. However, if the load current rises instantaneously at this time, due to huge RC time delay (up to 1 mS) caused by estimating an average PWM signal, the multi-phase switching converter will not be able to add phase quickly, resulting in a large undershoot at the output voltage and slow load transient response.

SUMMARY

An object of the present invention is to improve an accuracy of phase adding as well as load transient response performance of a multi-phase switching converter. The multi-phase switching converter comprises a plurality of switching phases configured to convert an input voltage to an output voltage, wherein the plurality of switching phases has a master phase and at least one slave phase. Each slave phase is configured to be enabled based on a phase additional signal. The multi-phase switching converter further comprises a master controller configured to generate a master control signal to control a switch in the master phase, a pulse generator configured to provide a pulse signal having a duty cycle of 0.5 by frequency-dividing the master control signal under a phase-added operation, and at least one slave controller. Each slave controller is configured to generate a respective slave control signal to control a switch in a corresponding slave phase that is to be enabled. Each slave controller comprises a first circuit, a second circuit and a comparison circuit. The first circuit is configured to charge a first capacitor with a charge current and discharge a second capacitor with a discharge current in response to logic high of the pulse signal. Wherein a ratio of the charge current and the discharge current is set based on a slave phase number under the phase-added operation. The second circuit charges the second capacitor with the charge current and discharges the first capacitor with the discharge current in response to logic low of the pulse signal. The comparison circuit compares a first voltage across the first capacitor with a second voltage across the second capacitor and provides an enable signal for turning on the switch in the corresponding slave phase to be enabled.

Another object of the present invention is to provide a control circuit used in a multi-phase switching converter. The multi-phase switching converter has a plurality of switching phases for converting an input voltage to an output voltage, wherein the plurality of switching phases has a master phase and at least one slave phase. The control circuit comprises a master control circuit configured to provide a master control signal to control a switch in the master phase, a pulse generator configured to provide a pulse signal having a duty cycle of 0.5 by frequency-dividing the master control signal under a phase-added operation, and at least one slave controller. Each slave controller is configured to generate a respective slave control signal to control a switch in a corresponding slave phase that is to be enabled based on a phase additional signal, wherein each slave controller respectively comprises a first circuit, a second circuit and a comparison circuit. The first circuit is configured to charge a first capacitor with a charge current and discharge a second capacitor with a discharge current in response to logic high of the pulse signal, wherein a ratio of the charge current and the discharge current is set based on a slave phase number under the phase-added operation. The second circuit is configured to charge the second capacitor with the charge current and discharge the first capacitor with the discharge current in response to logic low of the pulse signal. The comparison circuit is configured to compare a first voltage across the first capacitor with a second voltage across the second capacitor and provide an enable signal for controlling the switch in the corresponding slave phase to be enabled.

Yet another object of the present invention is to provide a control method of multi-phase switching converter. The multi-phase switching converter has a plurality of switching phases coupled in parallel for converting an input voltage to an output voltage. The plurality of switching phases has a master phase and at least one slave phase configured to be enabled based on a phase additional signal, each slave phase to be enabled has a first capacitor and a second capacitor. The control method comprises providing a master control signal supplied to the master phase, providing a pulse signal with 0.5 duty cycle by frequency-dividing the master control signal under a phase-added operation. In each slave phase to be enabled, the control method further comprises setting a ratio of a charge current and a discharge current based on a slave phase number under the phase-added operation, charging the first capacitor with the charge current and discharging the second capacitor with the discharge current in response to high logic of the pulse signal, discharging the first capacitor with the discharge current and charging the second capacitor with the charge current in response to logic low of the pulse signal, and based on the comparison of a first capacitor voltage and a second capacitor voltage, generating a respective enable signal for a corresponding slave phase to be enabled.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
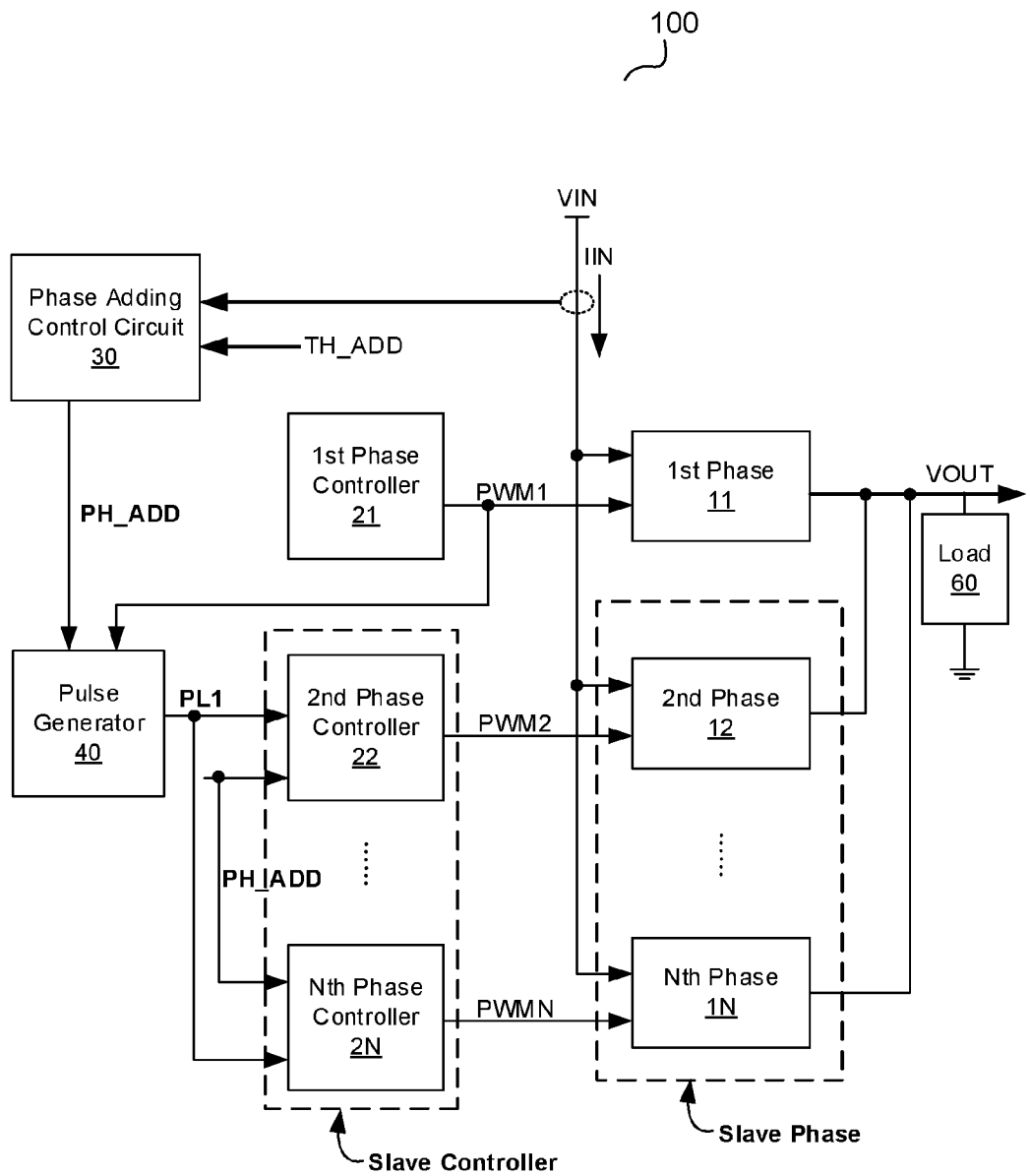
FIG. 1 shows a schematic diagram of a multi-phase switching converter 100 in accordance with an embodiment of the present invention.

FIG. 1 shows a schematic diagram of a multi-phase switching converter 100 in accordance with an embodiment of the present invention. The multi-phase converter 100 can be employed in any electronic device that can require output current greater than can be provided by a single-phase switching converter (e.g., a single-phase buck converter). For example, the multi-phase converter 200 can be implemented in battery-operated electronic devices to provide for fast charging of one or more cells of batteries of the device.

The multi-phase switching converter 100 comprises a plurality of switching phases 11~1N configured to convert an input voltage VIN to an output voltage VOUT for a load 60, a plurality of phase controllers 21~22N respectively corresponding to the plurality of switching phases 11~1N, a phase adding control circuit 30 and a pulse generator 40. The plurality of switching phases 11-1N has a first phase 11 configured as a master phase and other phases 12~1N configured as at least one slave phase. Wherein the at least one slave phase can be enabled based on a phase additional signal PH_ADD, to make the multi-phase switching converter 100 enter a phase-added operation.

In the embodiment shown in FIG. 1, a master controller (shown as a first phase controller 21) is configured to generate a master control signal PWM1 to control a switch in the master phase 11. In one embodiment, the master phase 11 provides a first phase current as the total output current to the load 60. If output current requirement for the load 60 increase beyond that can be provided by the master phase 11, or exceeds a current output limit of the master phase 11, the phase adding control circuit 30 is configured to provide the phase additional signal PH_ADD, to enable the at least one slave phase for providing additional output current to the load 60. In the embodiment shown in FIG. 1, the phase adding control circuit 30 provides the phase additional signal PH_ADD based on an input current IIN and a phase addition threshold TH_ADD. The details of this embodiment will be described below with reference to FIG. 2.

The pulse generator 40 is configured to provide a first pulse signal PL1 having a duty cycle of 0.5 by frequency-dividing the master control signal PWM1 under the phase-added operation. Each slave controller (any of the phase controllers 22~2n) is configured to generate a respective slave control signal to control a switch in a corresponding slave phase that is to be enabled by the phase additional signal PH_ADD. In this way, each slave phase (any of the slave phases 12~1n) that is to be enabled will provide the slave phase output current, which will be combined with the first phase current to provide the total current to the load 60, to provide an efficient phase addition operation for a wide range of load currents.

Figure 2:
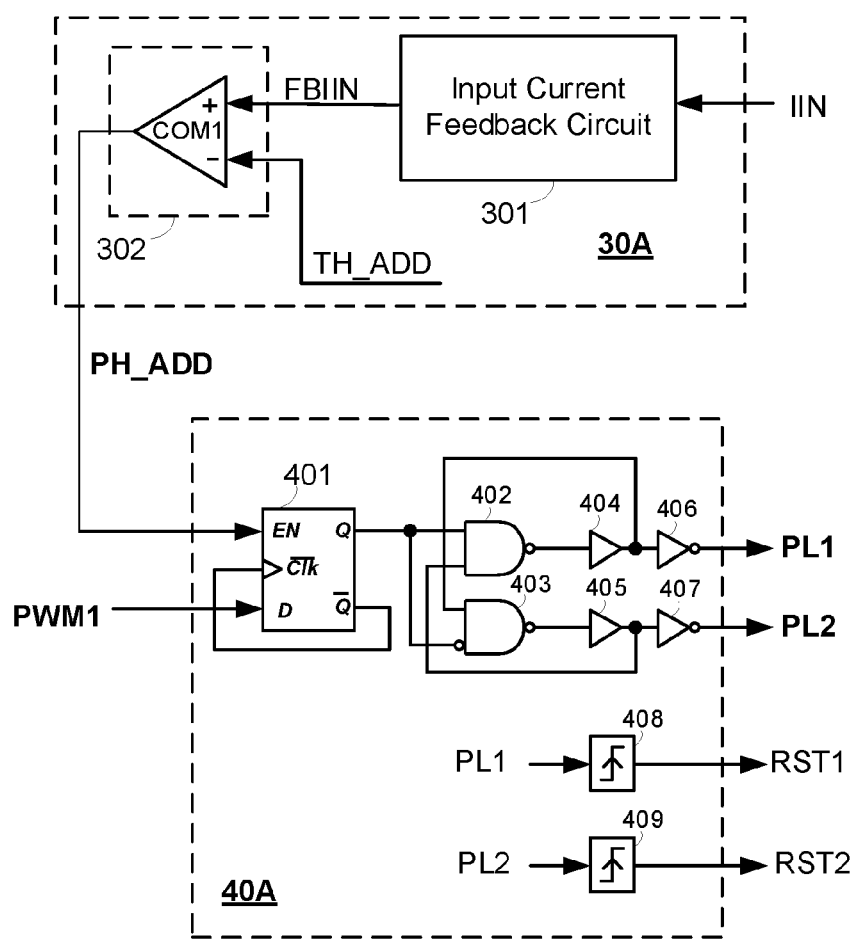
FIG. 2 shows a phase control circuit 30A and a pulse generator 40A used in a multi-phase switching converter in accordance with an embodiment of the present invention.

FIG. 2 shows a phase control circuit 30A and a pulse generator 40A used in a multi-phase switching converter in accordance with an embodiment of the present invention.

As shown in FIG. 2, the phase adding control circuit 30A comprises an input current feedback circuit 301 and a phase comparison circuit 302. The input current feedback circuit 301 is configured to provide an input current feedback signal FBIIN, which is indicative of the input current IIN to the multi-phase switching converter 100 shown in FIG. 1. The phase comparison circuit 302 comprises a comparator COM1. The comparator COM1 receives the input current feedback signal FBIIN and provides the phase additional signal PH_ADD in response to determining that the input current feedback signal FBIIN is greater than or equal to the phase addition threshold TH_ADD. In one embodiment, the phase addition threshold TH_ADD could be multiple values for enabling one or more slave phases. So that the slave controllers 22-2N can be configured to implement the phase-added operation to enable one or more slave phases to provide the additional output current based on the phase addition signal PH_ADD having multiple levels.

Accordingly, the phase adding control circuit 30A can be configured to implement phase addition by enabling at least one slave phase of the multi-phase converter 100 to contribute to the total amount of the output current being provided to the load 60 based on the phase addition signal PH_ADD.

In the embodiment shown in FIG. 2, the pulse generator 40A is configured to generate a first and second complementary pulse signals PL1 and PL2 based on the master control signal PWM1 supplied to the master phase 11 shown in FIG. 1. In one embodiment, the first pulse signals PL1 can have a frequency that is based on the master control signal PWM1. In one embodiment, the frequency of the first pulse signal PL1 is approximately half of the frequency of the master control signal PWM1 and has a duty cycle of approximately 50%.

As shown in FIG. 2, the pulse generator 40 includes a latch 401. In one embodiment, the latch 401 can be configured as D-latch. The latch 401 receives the master control signal PWM1 at a clock terminal and the phase additional signal PH_ADD at an enable terminal, and an inverting output that is provided to an input (e.g., a "D" input). The latch 401 thus generates the first pulse signal PL1 having rising and falling edges in response to a rising-edge of the master control signal PWM1. An output of the latch 401 (e.g., a "Q" output) is provided to a set of logic circuits (labeled as 402~407) that is configured to generate the non-overlapping first and second pulse signals PL1 and PL2. The first pulse signal PL1 can have a frequency that is equal to half the frequency of the master control signal PWM1, and can have duty-cycle of approximately 50%. In detail, when the first pulse signal PL1 is at a logic high state, the second pulse signal PL2 is at a logic low state, and vice versa.

In a further embodiment, the pulse generator 40 can be configured to provide two short pulse signals RST1 and RST2 based on the first and second pulse signals PL1 and PL2, respectively. In one embodiment, the first short pulse signal RST1 is generated when a rising edge of the master control signal PWM1 leads a rising edge of the first pulse signal PL1, and the second short pulse signal RST2 is generated when the rising edge of the master control signal PWM1 leads a falling edge of the first pulse signal PL1.

Figure 3:
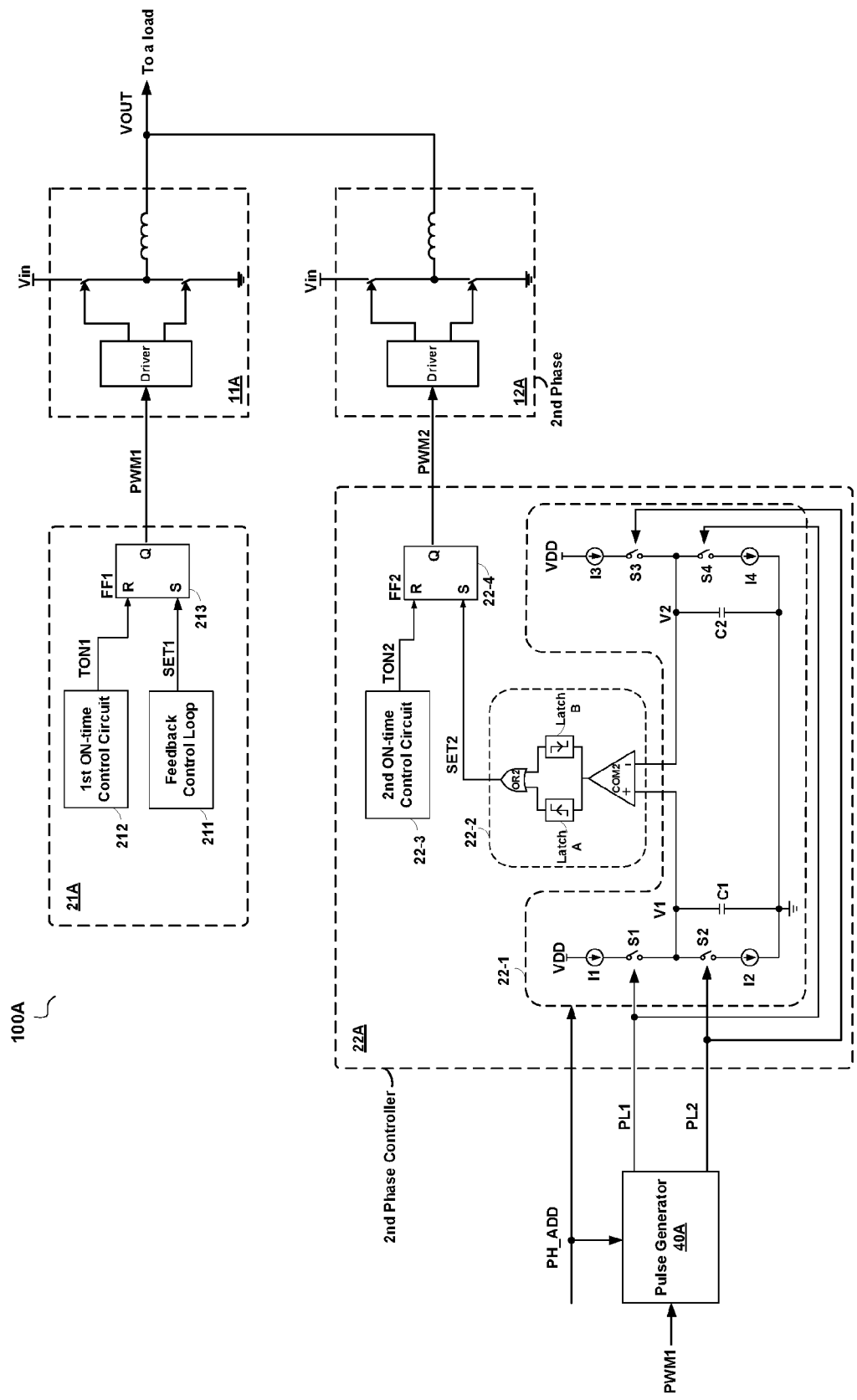
FIG. 3 shows a two-phase switching converter 100A under a phase-added operation in which one slave phase is added in accordance with an embodiment of the present invention.

FIG. 3 shows a two-phase switching converter 100A under a phase-added operation in which one slave phase is added in accordance with an embodiment of the present invention.

In the embodiment shown in FIG. 3, the two-phase switching converter 100A is under the phase-added operation in which one slave phase is to be enabled. The two-phase switching converter 100A comprises a master phase 11A, a master controller 21A, a pulse generator 40A, a slave phase 12A and a slave controller 22A.

Each of the master phase 11A and the slave phase 12 can include a driver circuit, one or more switches and an inductor for receiving an input voltage VIN and providing an output voltage VOUT. In the embodiment shown in FIG. 3, the master controller 21A is configured to generate a master control signal PWM1 to control a switch (e.g., a high side switch) in the master phase 11A. The master controller 21A comprises a feedback control loop 211, a first ON-time control circuit 212 and a master logic circuit 213. The feedback control loop 211 is configured to provide a first enable signal SET1 for turning on the switch in the master phase 11A based on feedback information (e.g., output voltage feedback signal, output current feedback signal, etc.) of the two-phase switching converter 100A. The first ON-time control circuit 212 is configured to provide a first ON-time control signal TON1 for control the ON-time of the switch in the master phase 11A. The master logic circuit 213 comprises a flip-flop FF1. The flip-flop FF1 has a setting terminal, a resetting terminal and an output terminal, wherein the setting terminal is configured to receive the first enable signal SET1, the resetting terminal is configured to receive the first ON-time control signal TON1, the flip-flop FF1 provides the master control signal PWM1 for controlling the switch in the master phase 11A.

The pulse generator 40A shown in FIG. 3 operates generally similarly as that shown in FIG. 2. As a result, operation and description of the pulse generator 40A in FIG. 3 is omitted for clarity.

The slave controller 22A is configured to receive the first pulse signal PL1, the second pulse signal PL2 and the phase addition signal PH_ADD, and generate a slave control signal PWM2 to control a switch in the slave phase 12A that is to be enabled. The slave controller 22A comprises first and second circuits 22-1, a comparison circuit 22-2, a second ON-time control circuit 22-3 and a slave logic circuit 22-4.

In the embodiment shown in FIG. 3, the first and second circuits 22-1 is configured to charge a first capacitor C1 with a charge current ICH and discharge a second capacitor C2 with a discharge current IDIS in response to logic high of the first pulse signal PL1. At the same time, the first and second circuits 22-1 is further configured to charge the second capacitor C2 with the charge current ICH and discharge the first capacitor C1 with the discharge current IDIS in response to logic low of the first pulse signal PL1.

In one embodiment, the first and second circuits 22-1 comprises a first charging current source 11, a first discharging current source 12, a second charging current source 13, a second discharging current source 14, a first capacitor C1, a second capacitor C2, a first switching unit and a second switching unit. Wherein the first switching unit includes switches S1 and S4 controlled by logic high of the first pulse signal PL1 and the second switching unit includes switches S2 and S3 controlled by logic high of the second pulse signal PL2.

In one embodiment, the first charging current source 11 has an input for permitting setting of the charge current ICH to the first capacitor C1, and the first discharging current source 12 has an input for permitting setting of the discharge current IDIS from the first capacitor C1. In this embodiment, the slave phase number under the phase-added operation is one and the charge current ICH is set to be equal to the discharge current IDIS.

As shown in FIG. 3, the switches S1 and S2 are controlled for alternatingly connecting the first capacitor C1 to the first charging current source 11 and the first discharging current source 12 to thereby alternatingly charge and discharge the first capacitor C1. Accordingly, a first voltage V1 is generated at an output of the first capacitor C1.

The second charging current source 13 has an input for permitting setting of the charge current ICH to the second capacitor C2, and the second discharging current source 14 has an input for permitting setting of the discharge current IDIS from the second capacitor C2. In this embodiment, the charge current ICH equals to the discharge current IDIS. As shown in FIG. 3, the switches S3 and S4 are controlled for alternatingly connecting the second capacitor C2 to the second charging current source 13 and the second discharging current source 14 to thereby alternatingly charge and discharge the second capacitor C2. Accordingly, a second voltage V2 is generated at an output of the second capacitor C2. In the embodiment shown in FIG. 3, the first capacitor C1 and the second capacitor C2 have the same values.

The comparison circuit 22-2 is configured to compare the first voltage V1 with the second voltage V2 and provide a second enable signal SET2 for turning on the switch in the slave phase 12A to be enabled. In the embodiment shown in FIG. 3, the comparison circuit 22-2 comprises a comparator COM2, a rising edge lath A, a falling edge lath B and an OR gate circuit OR2. The comparator COM2 is configured to provide a square signal based on a comparison of the first voltage V1 and the second voltage V2. The rising edge latch A is configured to provide a rising edge pulse signal at a rising edge of the square signal. The falling edge latch B is configured to provide a falling edge pulse signal at a falling edge of the square signal. The OR gate circuit OR2 is configured to receive the rising edge pulse signal and the falling edge pulse signal, and provide the second enable signal SET2 for the slave phase 12A.

The second ON-time control circuit 22-3 is configured to provide a second ON-time control signal TON2 for controlling the ON-time of the switch in the slave phase 12A. The slave logic circuit 22-4 comprises a flip-flop FF2. The flip-flop FF2 has a setting terminal, a resetting terminal and an output terminal, wherein the setting terminal is configured to receive the second enable signal SET2, and the resetting terminal is configured to receive the second ON-time control signal TON2. The flip-flop FF2 provides the slave control signal PWM2 to control the switch in the corresponding slave phase 12A.

Figure 4:
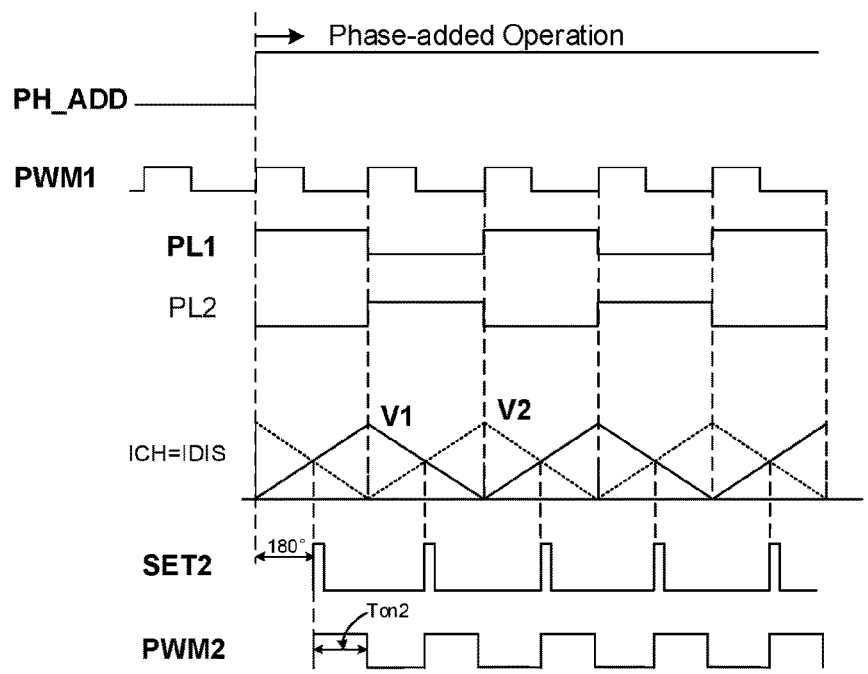
FIG. 4 shows a waveform diagram of signals of the two-phase switching converter 100A shown in FIG. 3 in accordance with an embodiment of the present invention.

FIG. 4 shows a waveform diagram of signals of the dual phase switching converter 100A shown in FIG. 3 in accordance with an embodiment of the present invention. As shown in FIG. 4, when the phase addition signal PH_ADD indicates that one slave phase is to be enabled, the first and second complementary pulse signal PL1 and PL2 are generated based on the master control signal PWM1 supplied to the master phase 11A, to have a frequency half of the frequency of the master control signal PWM1 and has a duty 50%. Then the first voltage V1 which has a period twice that of the master control signal PWM1 (i.e., the same period as that of the first pulse signal PL1) is generated in accordance with charging/discharging of the first capacitor C1, the second voltage V2 is generated in accordance with charging/discharging of the second capacitor C2. The crossover point of the first voltage V1 and the second voltage V2 provides a phase shift of 180° and generates the second enable signal SET2 for the slave phase 12A to be enabled. The slave control signal PWM2 can be provided based on the second enable signal SET2 and the second ON-time control signal TON2.

Thus, by implementing the phase-added operation described herein provides an efficient and fast phase shift scheme for phase addition over a wide range of output currents. Additionally, the two-phase switching converter 100A has improved load transient performance in contrasting to other two-phase switching converters that do not employ the pulse generator 40A and the slave controller 22A, as described herein.

Persons of ordinary skill in the art will appreciate that a boost converter with constant OFF-time control also can be used in a multi-phase switching converter under a phase-added operation. And a master control signal PWM1 supplied to the master phase is reset by a first enable signal from feedback loop and is set by a first OFF-time control signal. Correspondingly, the slave control signal PWM2 is supplied to the slave phase to be enabled, and the slave signal PWM2 will be reset by a second enable signal and will be set by a second OFF-time control signal through a RS flip-flop.

Figure 5:
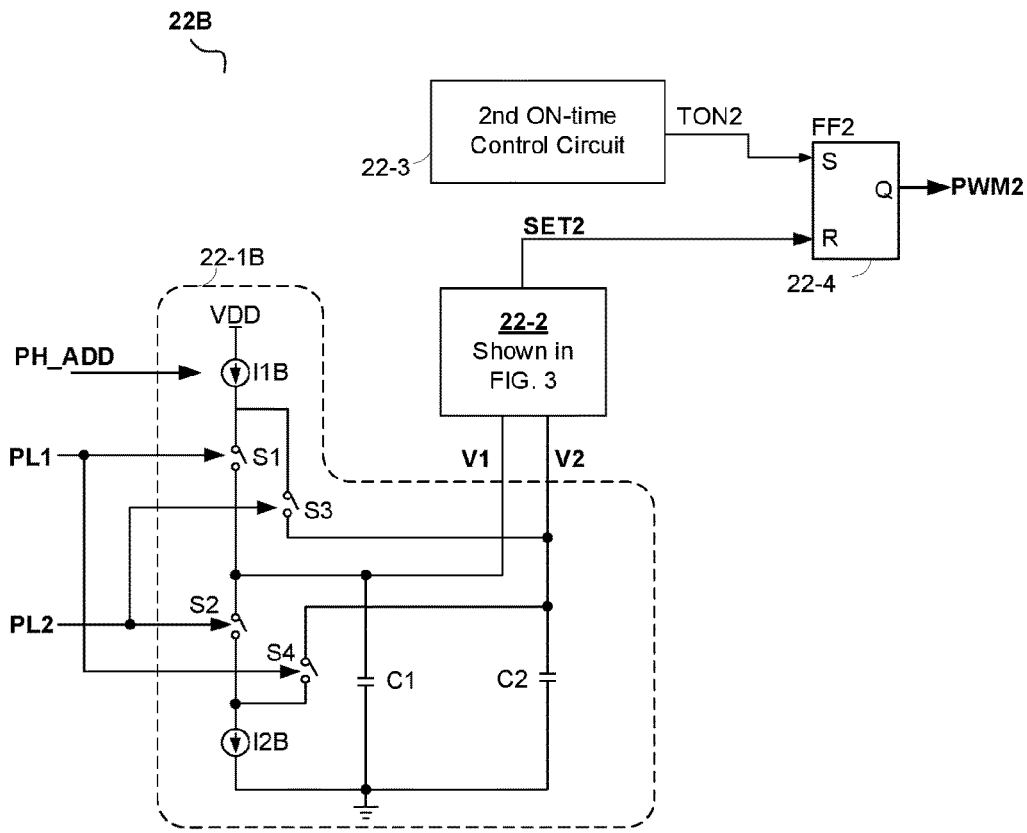
FIG. 5 shows another slave controller 22B used in the two-phase switching converter 100A shown in FIG. 3 in accordance with an embodiment of the present invention.

FIG. 5 shows another slave controller 22B used in the two-phase switching converter 100A shown in FIG. 3 in accordance with an embodiment of the present invention.

The slave controller 22B shown in FIG. 5 is similar with the slave controller 22A shown in FIG. 3, the difference is that the first and second circuits 22-1B comprises a charging current source I1B and a discharging current source I2B, a first switching unit and a second switching unit.

The charging current source I1B is connected to a supply voltage VDD, the first capacitor C1 is connected to a reference ground so that the charging current source I11 is connectable in series with the first capacitor C1 between the supply voltage VDD and the reference ground. In the embodiment, the first voltage V1 should be not higher than the supply voltage VDD. The ratio of the charge current ICH and the discharge current IDIS is set to be one.

In one embodiment, a switching period of the master control signal PWM1 is given as $T=(C*VP)/ICH$, where C is the capacitance of the first capacitor C, ICH is the charging current thereof, and VP is the peak value of the first voltage V1. Therefore, if the capacitance C is constant, when the frequency of the master control signal PWM1 is increased, the charging current ICH should be increase. When the frequency of the master control signal PWM1 is decreased, the charging current ICH should be decreased. Accordingly, the charging current source I1B has an input for permitting setting of the charge current ICH based on the frequency of the master control signal PWM1.

The discharging current source I2B is connected to the reference ground so that the discharging current source I2B is connectable in parallel with the first capacitor C1. In one embodiment, the discharging current source I2B comprises a plurality of identical cell current sources and a plurality of switches corresponding respectively to the plurality of cell current sources. wherein the plurality of cell current sources are sequentially coupled to the first capacitor C1 response to the phase additional signal PH_ADD for permitting setting the discharge current IDIS from the first capacitor C1.

The first switching unit (S1&S2) alternatingly connects the first capacitor C1 to the charging current source I1B and the discharging current source I2B to thereby alternatingly charge and discharge the first capacitor C1. The second switching unit (S3&S4) alternatingly connects the second capacitor C2 to the charging current source I1B and the discharging current source I2B to thereby alternatingly charge and discharge the second capacitor C2. In the embodiment shown in FIG. 5, the first capacitor C1 and second capacitor C2 have the same values.

Figure 6:
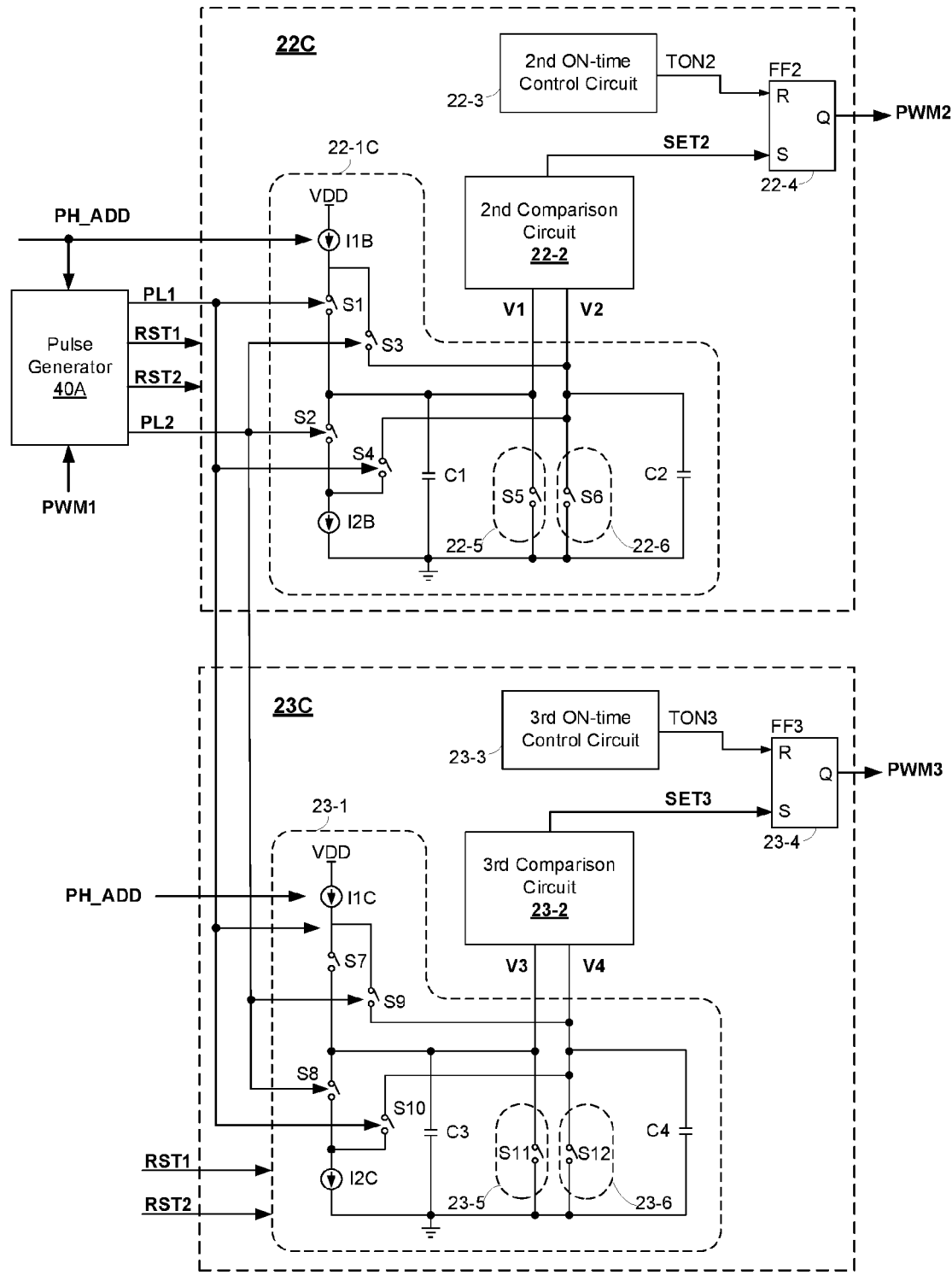
FIG. 6 shows a second phase controller 22C and a third phase controller 23C used in a three-phase switching controller under a phase-added operation in which two slave phase are added in accordance with an embodiment of the present invention.

FIG. 6 shows a second phase controller 22C and a third phase controller 23C used in a three-phase switching controller under a phase-added operation in which two slave phase are added in accordance with an embodiment of the present invention.

The second phase controller 22C in FIG. 6 is similar with the slave controller 22B shown in FIG. 5, the difference is that the slave controller 22C further comprises a first discharge path 22-5 and a second discharge path 22-6.

The first discharge path 22-5 is configured to reset the first voltage V1 by the first short pulse signal RST1 shown in FIG. 2, the second discharge path 226 is configured to reset the second voltage V2 by the second short pulse signal RST2 shown in FIG. 2. In one embodiment, the first discharge path 22-5 comprises a switch S5 coupled in parallel with the first capacitor C1, and the second discharge path 22-6 comprises a switch S6 coupled in parallel with the second capacitor C2. In the embodiment shown in FIG. 6, the first capacitor C1 and the second capacitor C2 have the same values.

The third phase controller 23C comprises a first and second circuit 23-1, a third comparison circuit 23-2, a third ON-time control circuit 23-3, a slave logic circuit 23-4, a first discharge path 23-5 and a second discharge path 23-6. The third phase controller 23C in FIG. 6 is similar with the second phase controller 22C shown in FIG. 6, As a result, operation of the third phase controller 23C is omitted for clarity. In the embodiment shown in FIG. 6, a capacitor C3 and a capacitor C4 have the same values.

In the phase-added operation in which two slave phases are added, the ratio of the charge current ICH and the discharge current IDIS corresponding to the second phase (i.e., a first slave phase) to be enabled is set to be 0.5, while the ratio of the charge current ICH and the discharge current IDIS corresponding to the third phase (i.e., a second slave phase) to be enabled is set to be 2. In other embodiments, the ratio of the charge current ICH and the discharge current IDIS can be adjusted based on the change of the capacitance.

Figure 7:
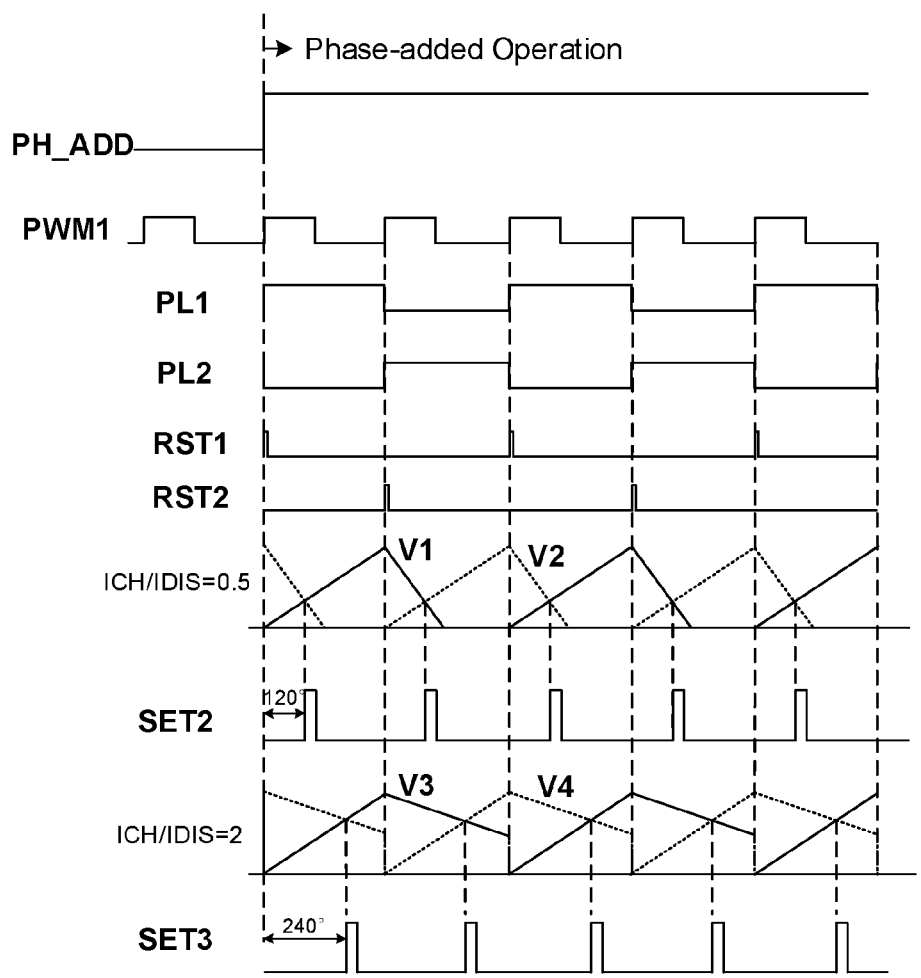
FIG. 7 shows a waveform diagram of signals of the three-phase switching converter under the phase-added operation in which two slave phases are added in accordance with an embodiment of the present invention.

FIG. 7 shows a waveform diagram of signals of the three-phase switching converter under the phase-added operation in which two slave phases are added in accordance with an embodiment of the present invention.

As shown in FIG. 7, the three-phase switching converter under the phase-added operation in which two slave phases are added to provide additional output current for load transient. The first and second complementary pulse signal PL1 and PL2 are generated based on the master control signal PWM1 supplied to a master phase, to have a frequency half of the frequency of the master control signal PWM1 and has a duty 50%. Additionally, the first and second short pulse signals RST1 and RST2 are generated based on the rising edges of the first and pulse signals PL1 and PL2, respectively.

For the second phase to be enabled, the ratio of the charge current and the discharge current is set to be 0.5. The first voltage V1 is generated in accordance with charging/discharging of the first capacitor C1, the second voltage V2 is generated in accordance with charging/discharging of the second capacitor C2. Furthermore, the first voltage V1 is reset when a rising edge of the master control signal PWM1 leads a rising edge of the first pulse signal PL1, the second voltage V2 is reset when the rising edge of the master control signal PWM1 leads a falling edge of the first pulse signal PL1. The crossover point of the first voltage V1 and the second voltage V2 provides a phase shift of 120° and generates the second enable signal SET2 for the second phase.

For the third phase to be enabled, the ratio of the charge current ICH and the discharge current IDIS is set to be 2. A third voltage V3 is generated in accordance with charging/discharging of a third capacitor C3, a fourth voltage V4 is generated in accordance with charging/discharging of the fourth capacitor C4. Furthermore, the third voltage V3 is reset when a rising edge of the master control signal PWM1 leads a rising edge of the first pulse signal PL1, the fourth voltage V4 is reset when the rising edge of the master control signal PWM1 leads a falling edge of the first pulse signal PL1. The crossover point of the third voltage V3 and the fourth voltage V4 provides a phase shift of 240° and generates the third enable signal SET3 for the third phase to be enabled.

Figure 8:
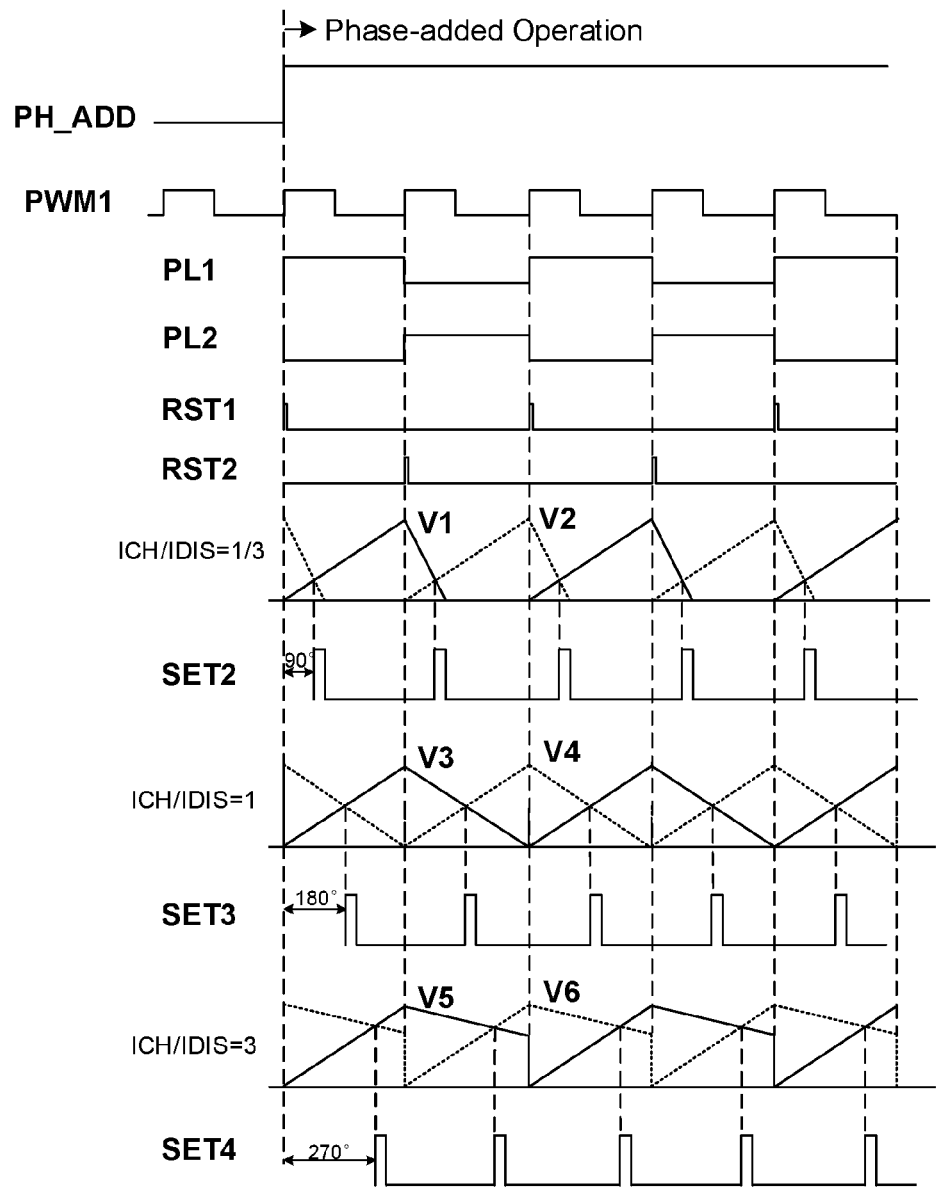
FIG. 8 shows a waveform diagram of signals of a four-phase switching converter under a phase-added operation in which three slave phases are added in accordance with an embodiment of the present invention.

FIG. 8 shows a waveform diagram of signals of a four-phase switching converter under the phase-added operation in which three slave phases are added in accordance with an embodiment of the present invention.

As shown in FIG. 8, the fourth-phase switching converter is under the phase-added operation in which three slave phases are added to provide additional output current for load transient. The first and second complementary pulse signal PL1 and PL2 are generated based on the master control signal PWM1 supplied to a master phase, to have a frequency half of the frequency of the master control signal PWM1 and has a duty 50%. Additionally, the first and second short pulse signals RST1 and RST2 are generated based on the rising edges of the first and pulse signals PL1 and PL2, respectively.

For a second phase to be enabled, the ratio of the charge current ICH and the discharge current IDIS is set to be 1/3. The crossover point of a first voltage V1 and a second voltage V2 provides a phase shift of 90° and generates a second enable signal SET2 for the second phase to be enabled.

For a third phase to be enabled, the ratio of the charge current ICH and the discharge current IDIS is set to be one. The crossover point of a third voltage V3 and a fourth voltage V4 provides a phase shift of 180° and generates a third enable signal SET3 for the third phase to be enabled.

For a fourth phase to be enabled, the ratio of the charge current ICH and the discharge current IDIS is set to be 3. A fifth voltage V5 is generated in accordance with charging/discharging of a fifth capacitor C5, a sixth voltage V6 is generated in accordance with charging/discharging of a sixth capacitor C6. The crossover point of a fifth voltage V5 and a sixth voltage V6 provides a phase shift of 270° and generates a fourth enable signal SET4 for the fourth phase to be enabled.

Figure 9:
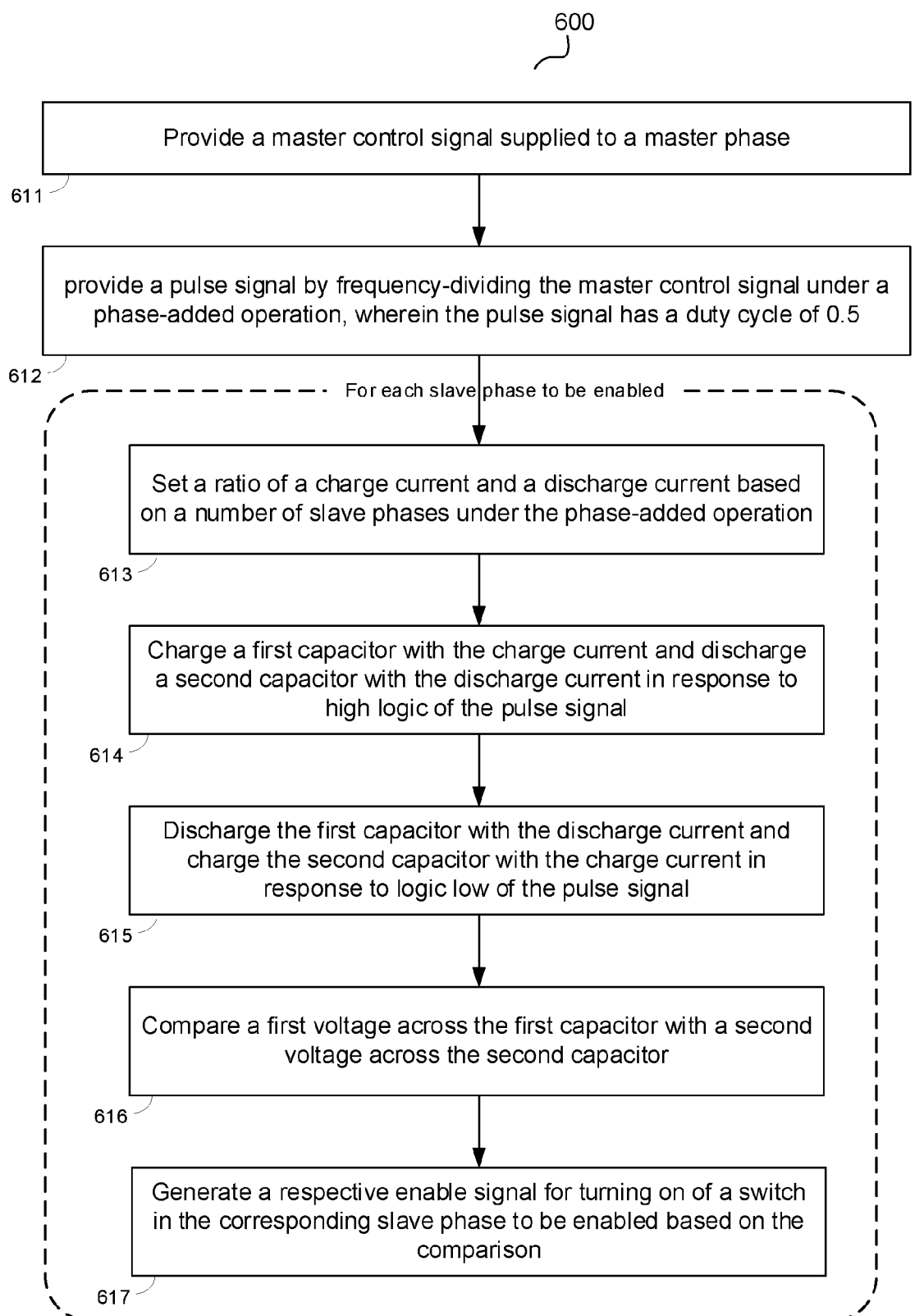
FIG. 9 shows a flow diagram of a control method 600 of a multi-phase switching converter under a phase-added operation in accordance with an embodiment of the present invention.

FIG. 9 shows a flow diagram of a control method 600 of a multi-phase switching converter under a phase-added operation in accordance with an embodiment of the present invention. The multi-phase switching converter has a plurality of switching phases coupled in parallel for converting an input voltage to an output voltage, wherein the plurality of switching phases has a master phase and at least one slave phase. Each slave phase is to be enabled based on a phase additional signal.

The control method 600 comprises steps 611~617. a master control signal is provided to the master phase (step 611), a pulse signal is provided by frequency-dividing the master control signal under a phase-added operation, wherein the pulse signal has a duty cycle of 0.5 (step 612), and each of at least one slave phase to be enabled is configured to perform steps 613~617. In detail, a ratio of a charge current and a discharge current is set based on a number of slave phases under the phase-added operation (step 613). A first capacitor is charged with the charge current and a second capacitor is discharged with the discharge current in response to high logic of the pulse signal (step 614), the first capacitor is discharged with the discharge current and the second capacitor is charged with the charge current in response to logic low of the pulse signal (step 615), a first voltage across the first capacitor is compared with a second voltage across the second capacitor (step 616), and a respective enable signal for turning on of a switch in the corresponding slave phase to be enabled based on the comparison (step 617).

In one embodiment, under the phase-added operation in which one slave phase is added, the ratio of the charge current and the discharge current corresponding to the one slave phase to be enabled is set to be one at step 613. In one embodiment, the first capacitor and the second capacitor have the same values.

In another embodiment, under the phase-added operation in which two slave phases are added, the ratio of the charge current and the discharge current corresponding to one slave phase to be enabled is set to be 0.5, the ratio of the charge current and the discharge current corresponding to another slave phase to be enabled is set to be 2 at step 613.

In yet another embodiment, under the phase-added operation in which three slave phases are added, wherein the ratio of the charge current and the discharge current corresponding to a first slave phase to be enabled is set to be 1/3, the ratio of the charge current and the discharge current corresponding to a second slave phase to be enabled is set to be 1, and the ratio of the charge current and the discharge current corresponding to a third slave phase to be enabled is set to be 3, at step 613.

In addition, those skilled in the art will appreciate that embodiments described herein are merely exemplary implementations including a slave phase, two slave phases or three slave phases that are added under the phase-added operation. But the disclosed phase shift scheme can be extended to any number of slave phases to be enabled under the phase-added operation.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The operation steps may be interchanged in any order without departing from the scope of the invention as long as such an interchange does not contradict the claim language and is not logically nonsensical. For example, the steps 614 and 615 of the control method 600 can be interchanged.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A multi-phase switching converter, comprising:
   a plurality of switching phases configured to convert an input voltage to an output voltage, wherein the plurality of switching phases has a master phase and at least one slave phase configured to be enabled based on a phase additional signal;
   a master controller configured to generate a master control signal to control a switch in the master phase;
   a pulse generator configured to provide a pulse signal having a duty cycle of 0.5 by frequency-dividing the master control signal under a phase-added operation;
   at least one slave controller, each slave controller is configured to generate a respective slave control signal to control a switch in a corresponding slave phase that is to be enabled, wherein each slave controller comprises:
      a first circuit configured to charge a first capacitor with a charge current and discharge a second capacitor with a discharge current in response to logic high of the pulse signal, wherein a ratio of the charge current and the discharge current is set based on a slave phase number under the phase-added operation;
      a second circuit configured to charge the second capacitor with the charge current and discharge the first capacitor with the discharge current in response to logic low of the pulse signal; and
      a comparison circuit configured to compare a first voltage across the first capacitor with a second voltage across the second capacitor and provide an enable signal for turning on the switch in the corresponding slave phase to be enabled.

2. The multi-phase switching converter of claim 1, wherein under the phase-added operation in which one slave phase is added, the ratio of the charge current and the discharge current corresponding to the one slave phase to be enabled is set to be one.

3. The multi-phase switching converter of claim 1, wherein under the phase-added operation in which two slave phases are added, the ratio of the charge current and the discharge current corresponding to one slave phase to be enabled is set to be 0.5, the ratio of the charge current and the discharge current corresponding to another slave phase to be enabled is set to be 2.

4. The multi-phase switching converter of claim 1, wherein under the phase-added operation in which three slave phases are added, wherein:
   the ratio of the charge current and the discharge current corresponding to a first slave phase to be enabled is set to be 1/3;
   the ratio of the charge current and the discharge current corresponding to a second slave phase to be enabled is set to be one; and
   the ratio of the charge current and the discharge current corresponding to a third slave phase to be enabled is set to be 3.

5. The multi-phase switching converter of claim 1, wherein each slave controller further comprises:
   a first discharge path configured to reset the first voltage when a rising edge of the master control signal leads a rising edge of the pulse signal; and
   a second discharge path configured to reset the second voltage when the rising edge of the master control signal leads a falling edge of the pulse signal.

6. The multi-phase switching converter of claim 1, wherein the comparison circuit comprises:
   a comparator configured to provide a square signal based on a comparison of the first voltage and the second voltage;
   a rising edge latch configured to provide a rising edge pulse signal at a rising edge of the square signal;
   a falling edge latch configured to provide a falling edge pulse signal at a falling edge of the square signal; and
   an OR gate circuit configured to receive the rising edge pulse signal and the falling edge pulse signal, and provide the enable signal.

7. The multi-phase switching converter of claim 1, wherein each slave controller further comprises:
   an ON-time control circuit configured to generate an ON-time control signal for controlling the ON-time of the switch in the corresponding slave phase to be enabled; and
   a flip-flop having a setting terminal configured to receive the enable signal, a resetting terminal configured to receive the ON-time control signal, and an output terminal, wherein the flip-flop provides the corresponding slave control signal at the output terminal.

8. The multi-phase switching converter of claim 1, wherein the first and second circuits comprise:
   a charging current source having an input for permitting setting of the charge current based on a frequency of the master control signal;
   a discharging current source having an input for permitting setting the discharge current;
   a first switching unit for alternatingly connecting the first capacitor to the charging current source and the discharging current source to thereby alternatingly charge and discharge the first capacitor; and
   a second switching unit for alternatingly connecting the second capacitor to the charging current source and the discharging current source to thereby alternatingly charge and discharge the second capacitor.

9. A control circuit used in a multi-phase switching converter having a plurality of switching phases for converting an input voltage to an output voltage, wherein the plurality of switching phases has a master phase and at least one slave phase, the control circuit comprising:
   a master control circuit configured to provide a master control signal to control a switch in the master phase;
   a pulse generator configured to provide a pulse signal having a duty cycle of 0.5 by frequency-dividing the master control signal under a phase-added operation;
   at least one slave controller, each slave controller is configured to generate a respective slave control signal to control a switch in a corresponding slave phase that is to be enabled based on a phase additional signal, wherein each slave controller respectively comprises:
      a first circuit configured to charge a first capacitor with a charge current and discharge a second capacitor with a discharge current in response to logic high of the pulse signal, wherein a ratio of the charge current and the discharge current is set based on a slave phase number under the phase-added operation;
      a second circuit configured to charge the second capacitor with the charge current and discharge the first capacitor with the discharge current in response to logic low of the pulse signal; and
      a comparison circuit configured to compare a first voltage across the first capacitor with a second voltage across the second capacitor and provide an enable signal for controlling the switch in the corresponding slave phase to be enabled.

10. The control circuit of claim 9, wherein under the phase-added operation in which one slave phase is added, the ratio of the charge current and the discharge current corresponding to the one slave phase to be enabled is set to be one.

11. The control circuit of claim 9, wherein under the phase-added operation in which two slave phases are added, the ratio of the charge current and the discharge current corresponding to one slave phase to be enabled is set to be 0.5, and the ratio of the charge current and the discharge current corresponding to another slave phase to be enabled is set to be 2.

12. The control circuit of claim 9, wherein each slave controller further comprises:
   a first discharge path configured to reset the first voltage when a rising edge of the master control signal leads a rising edge of the pulse signal; and
   a second discharge path configured to reset the second voltage when the rising edge of the master control signal leads a falling edge of the pulse signal.

13. The control circuit of claim 9, wherein the comparison circuit comprises:
   a comparator configured to provide a square signal based on a comparison of the first voltage and the second voltage;
   a rising edge latch configured to provide a rising edge pulse signal at a rising edge of the square signal;
   a falling edge latch configured to provide a falling edge pulse signal at a falling edge of the square signal; and
   an OR gate circuit configured to receive the rising edge pulse signal and the falling edge pulse signal, and provide the enable signal.

14. The control circuit of claim 9, wherein each slave controller further comprises:
   an OFF-time control circuit configured to generate an OFF-time control signal for controlling the OFF-time of the switch in the corresponding slave phase to be enabled; and
   a flip-flop having a resetting terminal configured to receive the enable signal, a setting terminal configured to receive the OFF-time control signal, and an output terminal, wherein the flip-flop provides the corresponding slave control signal at the output terminal.

15. A control method of multi-phase switching converter having a plurality of switching phases coupled in parallel for converting an input voltage to an output voltage, wherein the plurality of switching phases has a master phase and at least one slave phase configured to be enabled based on a phase additional signal, each slave phase to be enabled has a first capacitor and a second capacitor, and the control method comprises:
   providing a master control signal supplied to the master phase;
   providing a pulse signal by frequency-dividing the master control signal under a phase-added operation, wherein the pulse signal has a duty cycle of 0.5;
   wherein in each slave phase to be enabled:
      setting a ratio of a charge current and a discharge current based on a slave phase number under the phase-added operation;
      charging the first capacitor with the charge current and discharging the second capacitor with the discharge current in response to high logic of the pulse signal;
      discharging the first capacitor with the discharge current and charging the second capacitor with the charge current in response to logic low of the pulse signal;
      comparing a first voltage across the first capacitor with a second voltage across the second capacitor; and
      based on the comparison, generating a respective enable signal for turning on of a switch in a corresponding slave phase to be enabled.

16. The control method of claim 15, wherein under the phase-added operation in which one slave phase is added, the ratio of the charge current and the discharge current corresponding to the one slave phase to be enabled is set to be one.

17. The control method of claim 15, wherein under the phase-added operation in which two slave phases are added, the ratio of the charge current and the discharge current corresponding to one slave phase to be enabled is set to be 0.5, the ratio of the charge current and the discharge current corresponding to another slave phase to be enabled is set to be 2.

18. The control method of claim 15, wherein under the phase-added operation in which three slave phases are added, wherein:
   the ratio of the charge current and the discharge current corresponding to a first slave phase to be enabled is set to be 1/3;
   the ratio of the charge current and the discharge current corresponding to a second slave phase to be enabled is set to be one; and
   the ratio of the charge current and the discharge current corresponding to a third slave phase to be enabled is set to be 3.

19. The control method of claim 15, further comprises:
   resetting the first voltage when a rising edge of the master control signal leads a rising edge of the pulse signal; and
   resetting the second voltage when a rising edge of the master control signal leads a falling edge of the pulse signal.

20. The control method of claim 15, wherein providing the respective enable signal for the corresponding slave phase to be enabled comprising:
   generating a square signal based on the comparison of the first voltage and the second voltage; and
   generating the respective enable signal by detecting a rising edge and a falling edge of the square signal.

* * * * *